July 7, 1925.
J. THOMSEN
1,544,955
RESILIENT WHEEL
Filed April 17, 1922
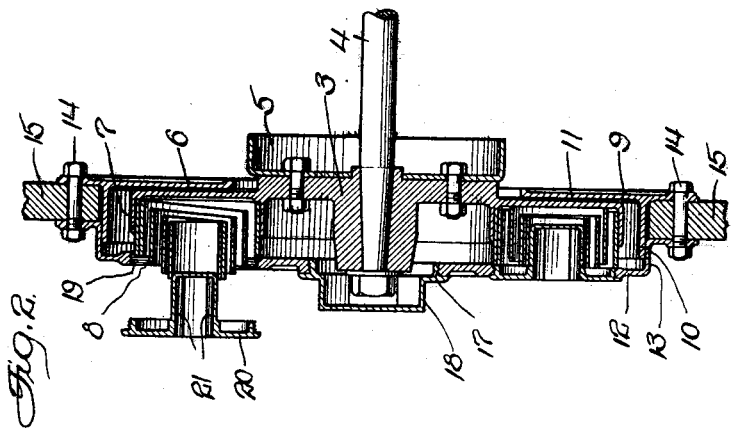
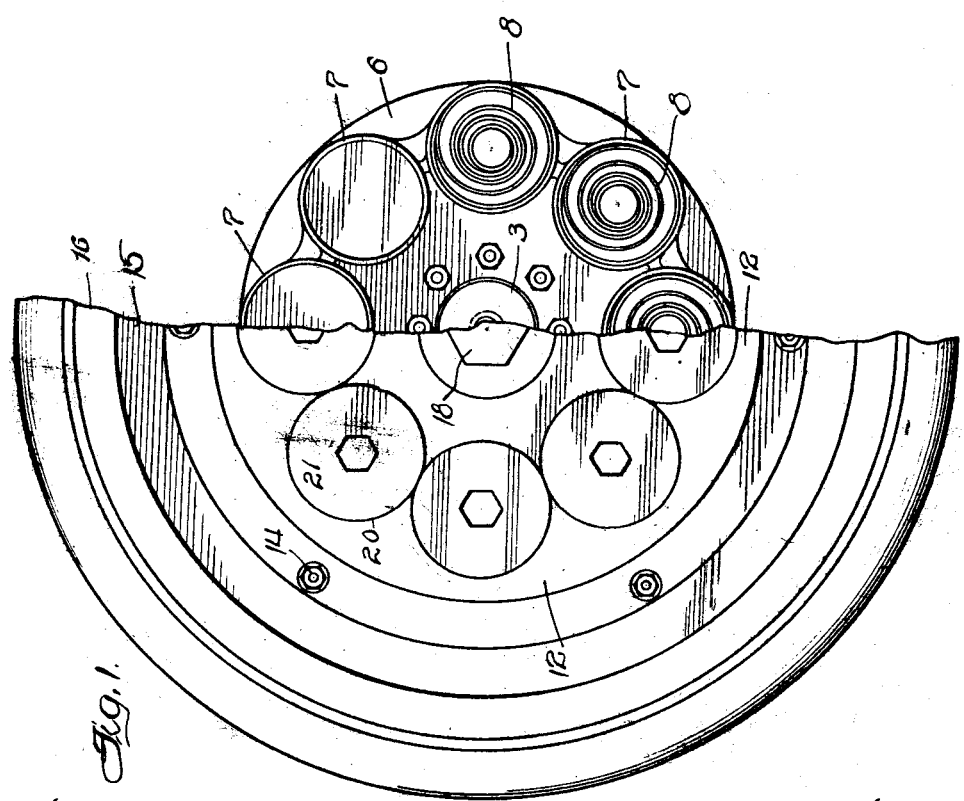
Inventor:
Johannes Thomsen
By Glenn S. Noble
Atty Patented July 7, 1925.

1,544,955

UNITED STATES PATENT OFFICE.

JOHANNES THOMSEN, OF CHICAGO, ILLINOIS.

RESILIENT WHEEL.

Application filed April 17, 1922. Serial No. 554,100.

*To all whom it may concern:*

Be it known that I, JOHANNES THOMSEN, a citizen of the United States, residing at Chicago, in the county of Cook and State of Illinois, have invented certain new and useful Improvements in a Resilient Wheel, of which the following is a specification.

This invention relates to resilient wheels or spring wheels which are adapted to be used on vehicles of various kinds and more particularly on motor vehicles or automobiles.

The objects of this invention are to provide a new and improved vehicle wheel, to provide a vehicle wheel which will absorb the shocks or jars to a certain degree by combined frictional and spring means; to provide a wheel having springs serving to take the radial thrust and also serving to give a frictional tension, and in general to provide such an improved construction as will be described in the following specification.

In the accompanying drawings showing a preferred form of this invention;

Figure 1 is a side view with the parts broken away or omitted to show the interior construction; and Figure 2 is a transverse sectional view.

In the particular form of the invention shown in these drawings the hub 3 is made of any suitable form to be secured to the axle or spindle 4 and may be provided with a brake drum 5. The hub has an annular disc or projection 6 which is provided with a plurality of cups or recesses 7 for receiving the springs 8. These are preferably volute springs made of flat metal so that they are adaped to act longitudinally as well as radially or transversely.

A ring 9 fits over the hub 3 and is provided with an inwardly extending flange 10. This ring may rest against the disc 6 but I prefer to insert a washer 11 between these parts, such washer being formed of fibre, asbestos or other suitable friction material. A second ring 12 is provided with a flange 13 which fits over the flange 10 and these rings are fastened together by means of bolts 14 which pass through the wheel disc 15 which carries the rim 16. The ring 12 has a threaded opening 17 for receiving the hub cap 18. This ring also has a plurality of threaded openings 19 for receiving the caps 20 for the springs 8. Each of these caps has an inwardly projecting bearing 21 which fits within the inner coils of the springs. These bearings are preferably made hollow and with annular sockets for receiving a wrench or tool for tightening the same. The arrangement is such that when the caps 20 are screwed in position they tend to compress the springs longitudinally which draws the ring 9 against the washer 11 and the latter against the disc 6, thereby bringing these parts into frictional engagement. The amount of the friction may be adjusted by the proper selection of the springs and also by the tightening of the spring caps 20.

It will be readily apparent that when the rim of the wheel receives a blow as when passing over rough ground, the thrust toward the hub will tend to be absorbed by the resiliency of all the springs which will act in unison against any transverse thrust or blow and will also be taken up in part by the frictional action between the ring and disc. It will also be noted that such frictional action serves to prevent recoil and thereby stabilizes the movement and further acts as a shock absorber. The entire device makes a substantially dust proof case so that the springs are not exposed and the caps are also made sufficiently large so that any spring may be readily removed and replaced without the necessity of disassembling the entire wheel.

The form of the device may be changed as for front and rear wheels or for different types of vehicles and therefore I do not wish to be limited to the exact construction herein shown and described except as specified in the following claims:

1. In a resilient wheel, the combination of a hub having a plurality of spring sockets, for supporting the springs, volute springs in said sockets, a case enclosing said hub and sockets and movable with respect thereto and bearings in said case engaging with said springs, said bearings fitting in the central portions of the springs and adapted to act laterally with respect to the springs.

2. In a resilient wheel, the combination of a hub having a disc projecting therefrom, a case fitting over said disc and adapted to engage frictionally therewith and to move radially with respect to the hub and resilient means interposed between the case and disc for supporting the case and also for pressing the case against the disc.

3. The combination of a hub having a disc, a case enclosing said hub and disc and engaging frictionally with the disc and springs interposed between the case and disc, said springs tending to prevent the lateral movement of the case and also placing a tension between the disc and case.

4. The combination of a hub having a disc projecting therefrom, sockets in said disc, a case having a ring portion engaging frictionally with the back of the disc, springs in said sockets and bearings in the case engaging with the springs.

5. In a device of the character set forth, the combination of a hub having a disc projecting therefrom, a plurality of cups on said disc, volute springs in said cups, a ring fitting over the hub, a friction washer between the ring and disc, a second ring secured to the first ring, threaded caps engaging with the second ring and having bearings for engagement with the respective springs, the arrangement being such that when the caps are in position they will compress the springs longitudinally and thereby place a tension between the first named ring and the disc.

6. In a device of the character set forth, the combination with a wheel disc, of a pair of rings secured to said disc and forming a central case, a hub having a disc with cups thereon mounted in the case, said disc bearing against one of said rings, volute springs in said cups, the second ring having threaded openings larger in diameter than the springs, caps for said openings, said caps having bearings for engagement with the springs, and a hub cap arranged in the center of the second ring.

7. A combined spring and friction wheel having a supporting member projecting from the hub, a rim member adapted to engage frictionally with said supporting member and springs coacting with said hub member and rim member adapted to place a tension between said members and also acting radially tending to prevent the radial displacement of the rim member with respect to the hub member.

JOHANNES THOMSEN.